Dec. 9, 1924.
P. ROBER
WALNUT GRAFT
Filed Dec. 29, 1922
1,518,603
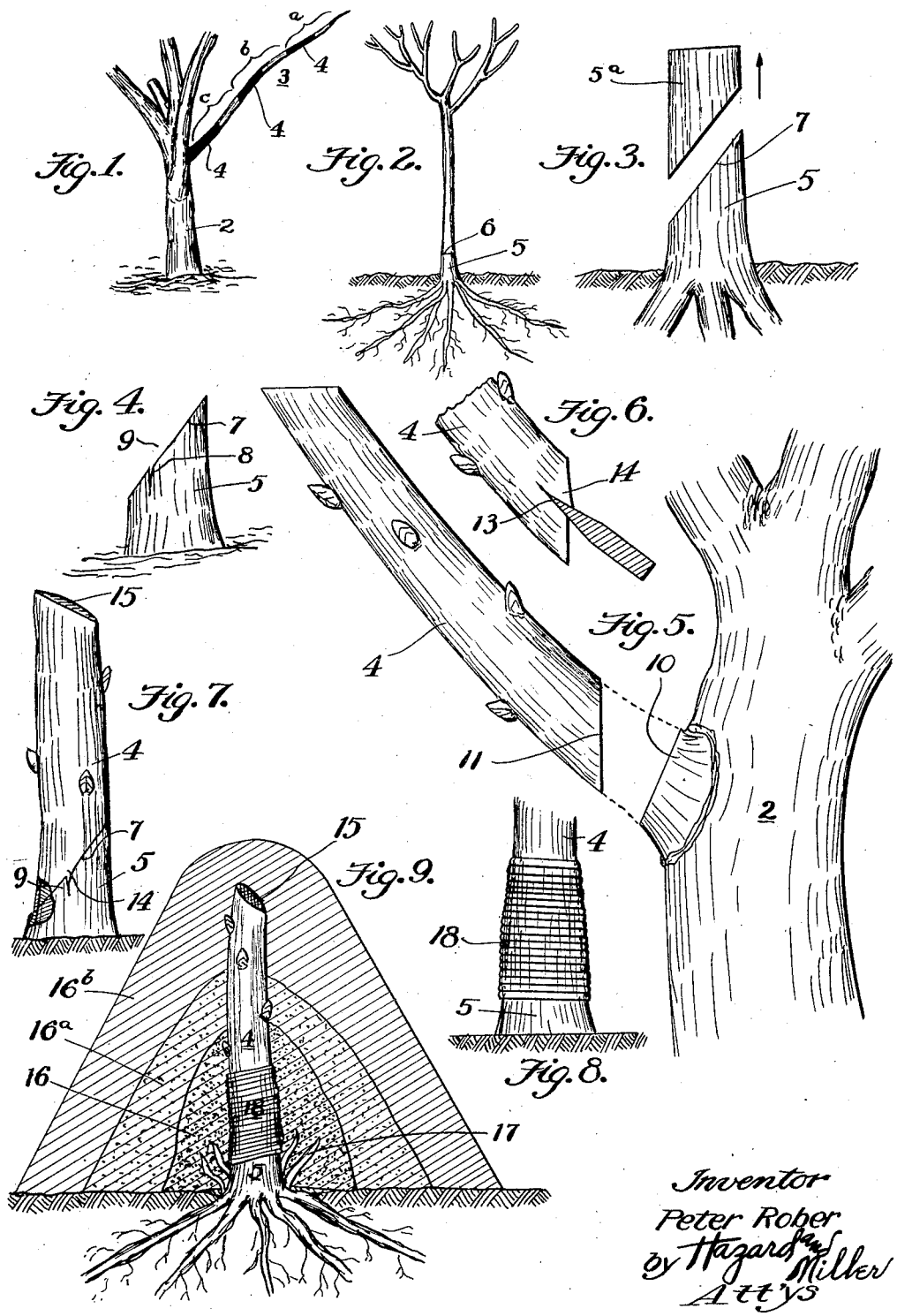

Patented Dec. 9, 1924.

1,518,603

UNITED STATES PATENT OFFICE.

PETER ROBER, OF EL MONTE, CALIFORNIA.

WALNUT GRAFT.

Application filed December 29, 1922. Serial No. 609,614.

*To all whom it may concern:*

Be it known that I, PETER ROBER, a citizen of the United States, residing at El Monte, in the county of Los Angeles and State of California, have invented new and useful Improvements in Walnut Grafts, of which the following is a specification.

This invention relates to tree culture and has for its object to provide an improved method for grafting trees, and more particularly for grafting walnut trees.

Other objects and advantages will be made manifest in the following specification of an embodiment of the invention illustrated in the accompanying drawings, wherein—

Figure 1 is an elevation showing a tree, one of the branches of which is marked in subdivisions approximating year growths.

Fig. 2 is a side elevation of a young seedling to be grafted.

Fig. 3 is a side elevation more or less on full scale and showing the root stock divided on an oblique line.

Fig. 4 is a side elevation of the divided root stock showing the second step in the process.

Fig. 5 is an elevation of a portion of a tree from which a budding branch or scion is removed for grafting on the root stock and indicating the scion taken from the tree.

Fig. 6 is a detail showing the step of splitting and upsetting the scion end.

Fig. 7 is a side elevation showing the scion and the root stock in abutting arrangement.

Fig. 8 is a side elevation of the stock and the applied scion with a joint covering wrapper.

Fig. 9 is a side elevation and section showing a mound covering the stock and scion for development.

According to my method which I have successfully demonstrated, a healthy tree is selected on which may be found limb or branch growth of from one to three years. Such a tree is shown in Figs. 1 and 2 and a three year old limb is designated at 3. Those versed in this art are aware that for each year's growth the branch or link will clearly show a first growth material for each year as well as the later growth. The tree branch 3, in the present case, is subdivided into three sections $a$, $b$ and $c$, and these sections are in turn divided into portions representing seasons' growth. The first growth of the season is designated at 4 along the branch, and these portions are selected while in bud with preferably not less than three buds on each section, and these sections become the scions referred to in the following grafting process. Preferably, the scions are not less than four inches long.

Seedling root stocks 5 are, in this method, cut off at a line 6 about an inch or an inch and a half from the spreading root joints, the line of cut 6 preferably being at right angles to the stem of the seedling for convenience. Thereafter the stump of the seedling 5 is cut on an oblique line 7 with as smooth plane as is practicable to obtain, this cutting leaving a waste section $5^a$. Next to the obliquely cut face 7 of the seedling trunk 5 is a slit as nearly along the axis of the trunk as may be practical as shown at 8, and that side of the slit from which the surface 7 extends downwardly is deflected to form an outwardly projecting prong or tongue 9; this, therefore, breaking the plane 7 by the outwardly projecting portion 9, as is clearly shown in Fig. 4.

As clearly shown in Fig. 5, the scion 4 may be roughly cut as on a line 10 from the body or a limb of the tree 2, and the lower ends of the scions collected are cut on the oblique line 11 which is preferably of such angle as to the general axis of the scion 4 as to cause the scion to assume a substantially vertical position when it is applied to the oblique face 7 of the seedling trunk 5, as is shown in Fig. 7. Before the scions 4 are applied to the seedling stumps, the oblique or lower end of each scion is slit longitudinally and preferably along the axis of the scion as at 13, Fig. 6, and one wall of the slot 13 is deflected outwardly to form a horn or projection 14 to approximately match the projection 9 of a seedling stump when the scion is applied. This is clearly shown in Fig. 7. It is understood that scions 4 will be matched to seedling stumps 5 of approximately equal diameter at the abutting ends.

The upper end of the scion is given a protecting coat of grafting wax 15 as in the usual practice, but no grafting material or foreign agent of any character is introduced between the abutting ends of a scion and its seedling stump.

After the scion has been applied to a stump, these are securely wrapped by any suitable medium, preferably by a wrapping of raffia 18, Fig. 8.

Following this, the stump and the scion are covered in a mound of earth which, according to the characteristics of the soil or earth, is tamped down about the stem; this being shown as having a densely tamped portion 16, a lesser tamped portion 16ª and a still lighter outer covering 16ᵇ built up to well cover the top waxed end of the stem.

The thus protected grafting in this coast locality may remain from about January 15 to about the middle of April, at which later date the mound is removed and all "wild" stump growth 17, Fig. 9, is removed, this growth springing up below the line of joint of the scion and the stump 5. After the removal of the wild growth, the stem is again entirely covered but without material packing and thereafter left to develop.

I have obtained successful growths in from seventy-five to ninety percent of operations.

Further embodiments, modifications and changes may be resorted to within the spirit of the invention as here claimed.

What is claimed is:

1. The method of grafting walnut trees which consists in cutting a seedling stem obliquely to its axis and making a substantially axially extending and transversely disposed slit in the oblique face and deflecting one wall of the slit laterally to form a projection outwardly from the plane of the oblique surface, complementarily obliquely cutting the lower end of a scion and forming in a similar manner a deflected tongue and abutting the scion to the seedling stem with the oblique planes in juxtaposition and said tongues in abutment, wrapping the zone of joint of the scion and the stem, and tamping an earth mound around and over the stem and the applied scion.

2. The method of grafting walnut trees which consists in cutting a seedling stem obliquely to its axis and making a substantially axially extending and transversely disposed slit in the oblique face and deflecting one wall of the slit laterally to form a projection outwardly from the plane of the oblique surface, complementarily obliquely cutting the lower end of a scion and forming in a similar manner a deflected tongue and abutting the scion to the seedling stem with the oblique planes in juxtaposition and said tongues in abutment, wrapping the zone of joint of the scion and the stem, tamping an earth mound around and over the stem and the applied scion, leaving the tamped mound for a period sufficient to permit development of growth on the stem of the seedling, then removing the tamped mound and removing all wild growth from the seedling stem and again mounding over the stem and the scion.

In testimony whereof I have signed my name to this specification.

PETER ROBER.